Sept. 10, 1963     H. B. NELSON ETAL     3,103,634

AFC MONITORING

Filed Dec. 9, 1958

INVENTORS
HAROLD B. NELSON
AND FLOYD R. SCRIPTURE
BY
ATTORNEYS

United States Patent Office 3,103,634
Patented Sept. 10, 1963

3,103,634
AFC MONITORING
Harold B. Nelson, Natick, and Floyd R. Scripture, Stoughton, Mass., assignors to the United States of America as represented by the Secretary of the Air Force
Filed Dec. 9, 1958, Ser. No. 779,264
1 Claim. (Cl. 328—140)

This invention relates to monitoring devices and has particular reference to an automatic frequency control monitor which measures the intermediate frequency of an AFC system.

The device of this invention is intended to be used with monitors of other circuits of a radar or other electronic system to form an automatic failure prediction system whereby impending failures are recognized before an actual shutdown of the monitored equipment is necessary in order that standby units may be substituted or that repairs may be made, thus enabling a substantially continuous operation of the equipment. Reliability of monitored components may be considered to be increased because components will be replaced prior to actual failure. Furthermore, monitoring enables complete analysis of system operation which facilitates improvement of equipment design or compensation in operation to enhance the equipment reliability. To accomplish the purposes of monitoring it is necessary to design the monitor with a reliability which is greater than the equipment to be monitored.

Accordingly, it is an object of this invention to produce an AFC monitor which is extremely reliable.

It is also an object of this invention to produce an AFC monitor which measures the intermediate frequency of an automatic frequency control system.

It is another object of this invention to produce an improved discriminator circuit.

It is still another object of this invention to produce an AFC monitoring unit which enables substantially continuous operation of the monitored equipment by producing a signal on impending circuit failure.

It is a further object of this invention to produce a monitoring unit which utilizes conventional, currently available components that lend themselves to standard mass production manufacturing techniques.

Figure 1:
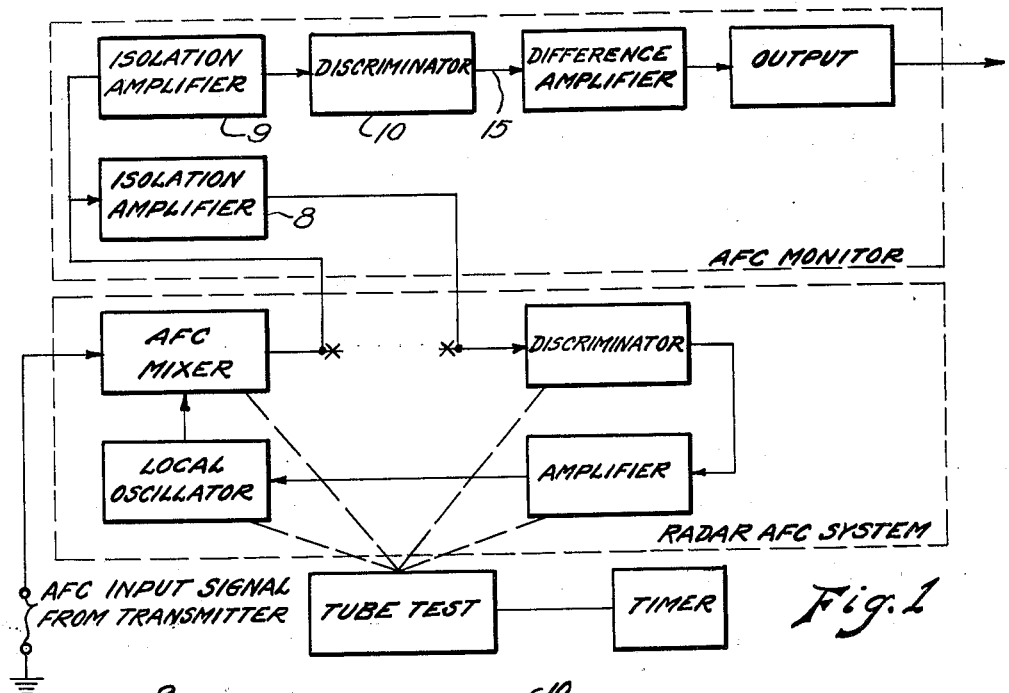
Figure 2:
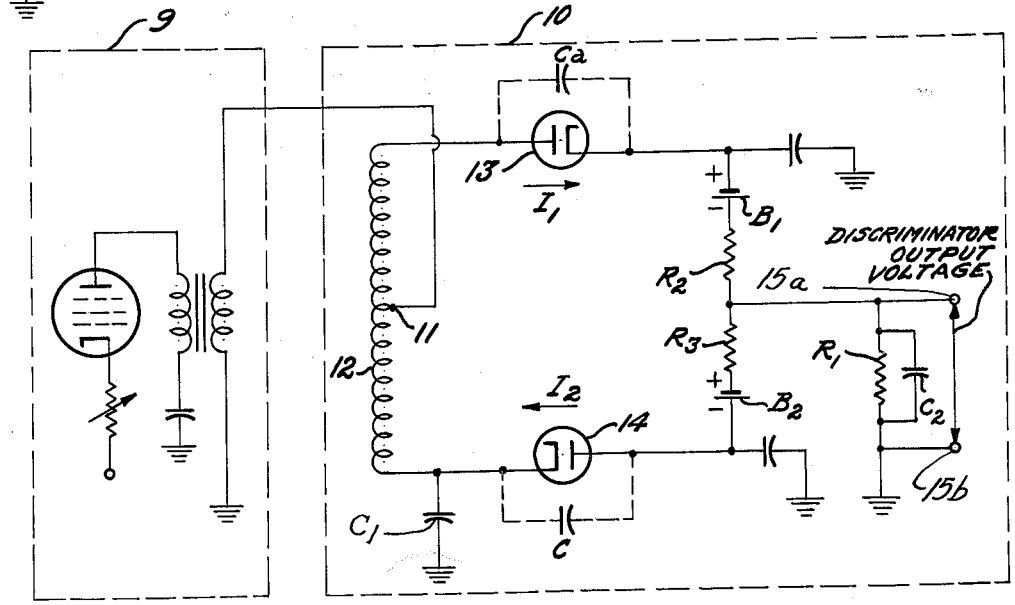

These and other advantages, features and objects of the invention will become more apparent from the following description taken in connection with the illustrative embodiments in the accompanying drawings, wherein:

FIGURE 1 is a block diagram of the AFC monitor of this invention applied to the AFC section of a radar set; and FIGURE 2 is a schematic diagram of the discriminator of the monitor unit.

The AFC monitor unit of this invention is basically a frequency discriminator circuit which measures the radar intermediate frequency which, in normal operation, is determined and maintained by the automatic frequency control (AFC) system.

The AFC system is a closed loop feed back system, as can be seen in FIGURE 1, wherein an error signal is amplified and used to control the local oscillator frequency. If the AFC system is operating properly, the loop gain is high and the operating frequency error is small. If, on the other hand, some component in the feed back loop becomes weak and lowers the loop gain, the frequency error will increase. Thus, a monitoring of the intermediate frequency enables detection of weak components in the AFC loop. In order to predict impending failure of vacuum tubes in the AFC loop, a tube test unit utilizing the marginal checking technique may be provided. This section operates by reducing the filament voltage applied to the tubes in the AFC loop for a 30 seconds interval during which time the gain is measured. A drop in transconductance will generally show a much greater drop in gain under conditions of low filament voltage than will a good tube, therefore earlier detection of tube failure is made possible. Of course the reduction of filament voltage would occur at test intervals designated by a timer. The tube test unit represents standard circuitry for measuring gain.

The monitor unit of this invention contains an isolation amplifier section to prevent interaction between the radar AFC system and the AFC monitor. The output impedance of the isolation amplifier 8 that feed the radar AFC system is arranged to have the same output impedance as the AFC mixer; and the cable connecting the isolation amplifier to the radar AFC system should have the same length as that normally connecting the output of the AFC mixer to the radar AFC unit. Thus, the addition of the AFC monitor unit does not require adjustment or readjustment of the radar AFC system. The isolation amplifier tubes are operated at approximately one-fourth their maximum rated input power in order to provide improved reliability and receive their power from the radar set to be monitored.

The discriminator unit 10 forms the heart of the invention and has the following characteristics:

(1) The slope of the discriminator curve is independent of input signal level over a relatively wide range of input levels;

(2) The output is essentially independent of pulse repetition frequency; and (3) The output is essentially independent of pulse width.

The discriminator of FIGURE 2 has the above-mentioned characteristics. The signal from the isolation amplifier, partially shown at 9, is presented to the discriminator unit 10 by applying a driving voltage to the center tap 11 of discriminator coil 12. This results in in-phase voltages being developed across the inter-electrode capacitances of the diodes 13 and 14. A circulating current is caused to flow in the parallel resonant circuit consisting of the diode stray capacitances C and $C_a$, and the discriminator coil 12 by adding a small capacitor $C_1$ in shunt with the stray capacitance of one diode. This circulating current develops voltages which are out of phase at the two diodes, and which, at the resonant frequency of the discriminator circuit, are in quadrature with the in-phase voltages. The rectified current passed by each diode is proportional to the vector sum of the IF component voltages appearing across diodes 13 and 14. These currents are shown as $I_1$ and $I_2$ on the schematic diagram. The discriminator output voltage 15 is the product of the difference between $I_1$ and $I_2$ and the load resistance $R_1$. A bias section comprising batteries $B_1$ and $B_2$ and resistors $R_2$ and $R_3$, applies a voltage in series with each diode such that no output 15a and 15b can be obtained until the IF voltage exceeds the bias voltage. Thus, during the period between pulses from the radar unit, the diodes 13, 14 are cut off and filter capacitor $C_2$ discharges through $R_1$. The time constant is sufficiently large that the output is a D.-C. voltage.

Referring back to FIGURE 1, a signal is coupled from the radar AFC system and applied to the discriminator 10 through an isolation amplifier 9 whose output voltage is presented to a difference amplifier unit. In order to set the operating signal level for the discriminator to the optimum point, the gain of the isolation amplifier may be made variable, for example, by means of a variable cathode resistance. The conventional difference amplifier is a standard highly degenerative circuit having a large amount of cathode feed back. Sensitivity of the monitor unit may be achieved by rendering the gain of this stage variable. The output from the difference amplifier is applied to an output circuit designed to operated signaling device such as a relay to designate a change in the measured intermediate frequency. Thus it can be seen that a radar AFC system can be monitored by utilizing the IF frequency to denote impending failure of the system. Furthermore, the addition of a tube checking section provides a complete monitor system which enables almost continuous operation of the AFC unit by providing a notification of impneding equipment failure.

Although the invention has been described with reference to a particular embodiment, it will be understood to those skilled in the art that the invention is capable of a variety of alternative embodiments within the spirit and scope of the appended claim.

We claim:

A discriminator comprising coil means for receiving a signal at its center, anode means of a first diode connected to one end of said coil, cathode means of a second diode connected with the other end of said coil, a pair of D.-C. voltage generators, with resistors interposed therebetween, serially connecting said diodes, said D.-C. voltage generators constituting means for biasing the cathode of said first diode with a positive potential, and also constituting means for biasing the anode of said second diode with a negative potential, capacitor means in shunt with said diodes for creating a current differential, as between said diodes, and means center-tapping said resistors for deriving an output proportional to the difference in current flow from each of said diodes.

References Cited in the file of this patent

UNITED STATES PATENTS

| | | |
|---|---|---|
| 2,494,751 | Forster | Jan. 17, 1950 |
| 2,497,841 | Seeley | Feb. 14, 1950 |
| 2,520,621 | Beers | Aug. 27, 1950 |
| 2,682,606 | Keizer et al. | June 29, 1954 |